(12) United States Patent
Tanaka et al.

(10) Patent No.: US 9,190,019 B2
(45) Date of Patent: Nov. 17, 2015

(54) IMAGE DISPLAY APPARATUS

(71) Applicant: PANASONIC CORPORATION, Osaka (JP)

(72) Inventors: Yasuhiro Tanaka, Hyogo (JP); Katsuhiko Hayashi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 157 days.

(21) Appl. No.: 13/773,175

(22) Filed: Feb. 21, 2013

(65) Prior Publication Data

US 2013/0222234 A1 Aug. 29, 2013

(30) Foreign Application Priority Data

Feb. 23, 2012 (JP) ................................. 2012-037632

(51) Int. Cl.
| | | |
|---|---|---|
| *G09G 5/00* | (2006.01) | |
| *G09G 5/10* | (2006.01) | |
| *G06F 3/01* | (2006.01) | |
| *H04N 13/00* | (2006.01) | |
| *H04N 13/04* | (2006.01) | |

(52) U.S. Cl.
CPC *G09G 5/10* (2013.01); *G06F 3/011* (2013.01); *H04N 13/00* (2013.01); *H04N 13/0404* (2013.01); *H04N 13/0468* (2013.01); *G09G 2354/00* (2013.01)

(58) Field of Classification Search
USPC .................................................. 345/156, 87
See application file for complete search history.

(56) References Cited

U.S. PATENT DOCUMENTS

| | | | |
|---|---|---|---|
| 5,943,166 A * | 8/1999 | Hoshi et al. ................... 359/475 |
| 6,061,083 A | 5/2000 | Aritake et al. | |
| 6,276,803 B1 * | 8/2001 | Aoyama et al. ................. 353/81 |
| 2006/0079728 A1 | 4/2006 | Kuiper et al. | |
| 2007/0153162 A1 * | 7/2007 | Wright et al. ................... 349/96 |
| 2009/0225244 A1 * | 9/2009 | Wang et al. ..................... 349/15 |
| 2010/0110558 A1 * | 5/2010 | Lee et al. ...................... 359/639 |
| 2010/0157026 A1 | 6/2010 | Reichelt | |
| 2011/0013244 A1 | 1/2011 | Futterer | |
| 2011/0090413 A1 * | 4/2011 | Liou ............................... 349/15 |

(Continued)

FOREIGN PATENT DOCUMENTS

| | | |
|---|---|---|
| JP | 09-289655 A | 11/1997 |
| JP | 2006-509263 A | 3/2006 |

(Continued)

*Primary Examiner* — Alexander Eisen
*Assistant Examiner* — Kebede Teshome
(74) *Attorney, Agent, or Firm* — McDermott Will & Emery LLP

(57) ABSTRACT

An image display apparatus makes the emission angle range of emitted light bilaterally symmetrical, at low cost, irrespective of the material refractive index of a prism composing a liquid crystal prism. The image display apparatus includes an image display panel, a backlight device located on a back surface side of the image display panel, a liquid crystal prism element located between the image display panel and the backlight device, an offset optical element located between the image display panel and the backlight device and configured to deflect light incident thereon, a position detection section configured to detect a viewing position of a viewer, and a control section configured to control a voltage applied to a liquid crystal prism element, in accordance with the viewing position detected by the position detection section.

8 Claims, 7 Drawing Sheets

(56) References Cited

U.S. PATENT DOCUMENTS

2012/0154450 A1* 6/2012 Aho et al. ............... 345/690
2012/0154463 A1* 6/2012 Hur et al. ................ 345/691
2013/0076741 A1* 3/2013 Eguchi .................... 345/419

FOREIGN PATENT DOCUMENTS

| | | |
|---|---|---|
| JP | 2010-529485 A | 8/2010 |
| JP | 2011-516909 A | 5/2011 |
| JP | 2011-248367 A | 12/2011 |

* cited by examiner

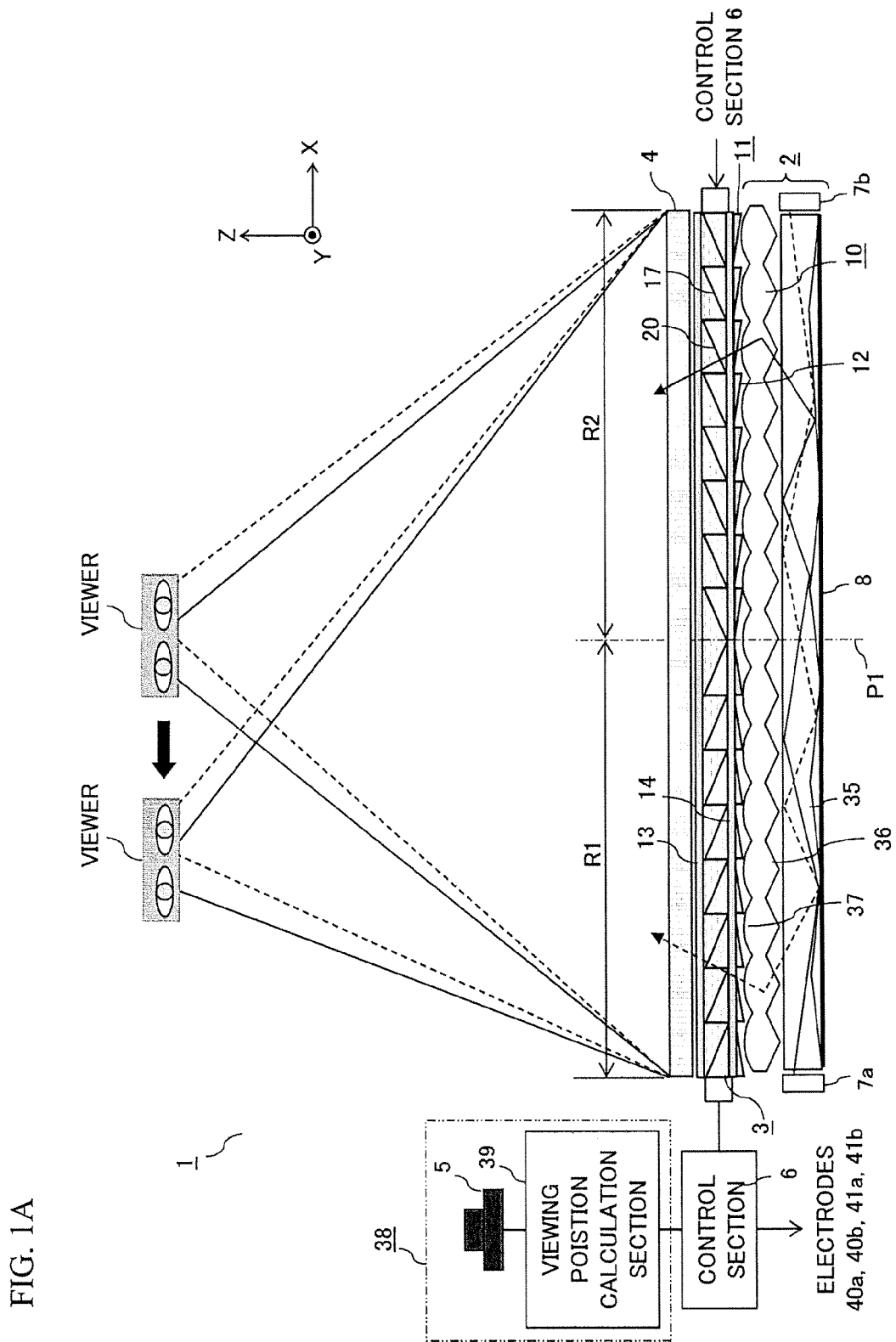

IMAGE DISPLAY APPARATUS

CROSS REFERENCE TO RELATED APPLICATION

The disclosure of Japanese Patent Application No. 2012-037632, filed on Feb. 23, 2012, is incorporated herein by reference.

BACKGROUND

1. Field

The present disclosure relates to an image display apparatus for displaying an image, such as a liquid crystal display.

2. Description of the Related Art

Japanese Laid-Open Patent Publication No. 2010-529485 discloses an automatic stereoscopic display that causes images to be stereoscopically viewed by alternately providing light of an image for right eye and light of an image for left eye to the eyes of multiple observers, respectively. In the apparatus disclosed in Japanese Laid-Open Patent Publication No. 2010-529485, a refraction state of light is changed by deflection means so as to follow the eye position movement of the observers. The deflection means is composed of droplet control (electrowetting) cells containing two types of immiscible liquids. When a voltage is applied to the electrowetting cells, the interface between the liquids is changed, whereby a prism function is realized by the electrowetting cells.

SUMMARY

The present disclosure provides an image display apparatus effective for making the range of the emission angle of emitted light bilaterally symmetrical.

An image display apparatus according to the present disclosure includes: an image display panel; a backlight device located on a back surface side of the image display panel; a first optical element located between the image display panel and the backlight device and configured to deflect light incident thereon; a second optical element located between the image display panel and the first optical element and configured to deflect light incident thereon; a third optical element located between the image display panel and the second optical element and configured to change a deflection direction of emitted light by changing a refractive index thereof in accordance with a voltage applied thereto; a position detection section configured to detect a position of a user; and a control section configured to control the voltage applied to the third optical element, on the basis of information about the position of the user detected by the position detection section.

The present disclosure is effective for making the range of the emission angle of emitted light bilaterally symmetrical with respect to the front position of the image display apparatus.

BRIEF DESCRIPTION OF THE DRAWINGS

FIG. 1A is a schematic configuration diagram of an image display apparatus according to an embodiment of the present disclosure;

DETAILED DESCRIPTION

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

<1. Configuration of Image Display Apparatus>

Figure 1B:
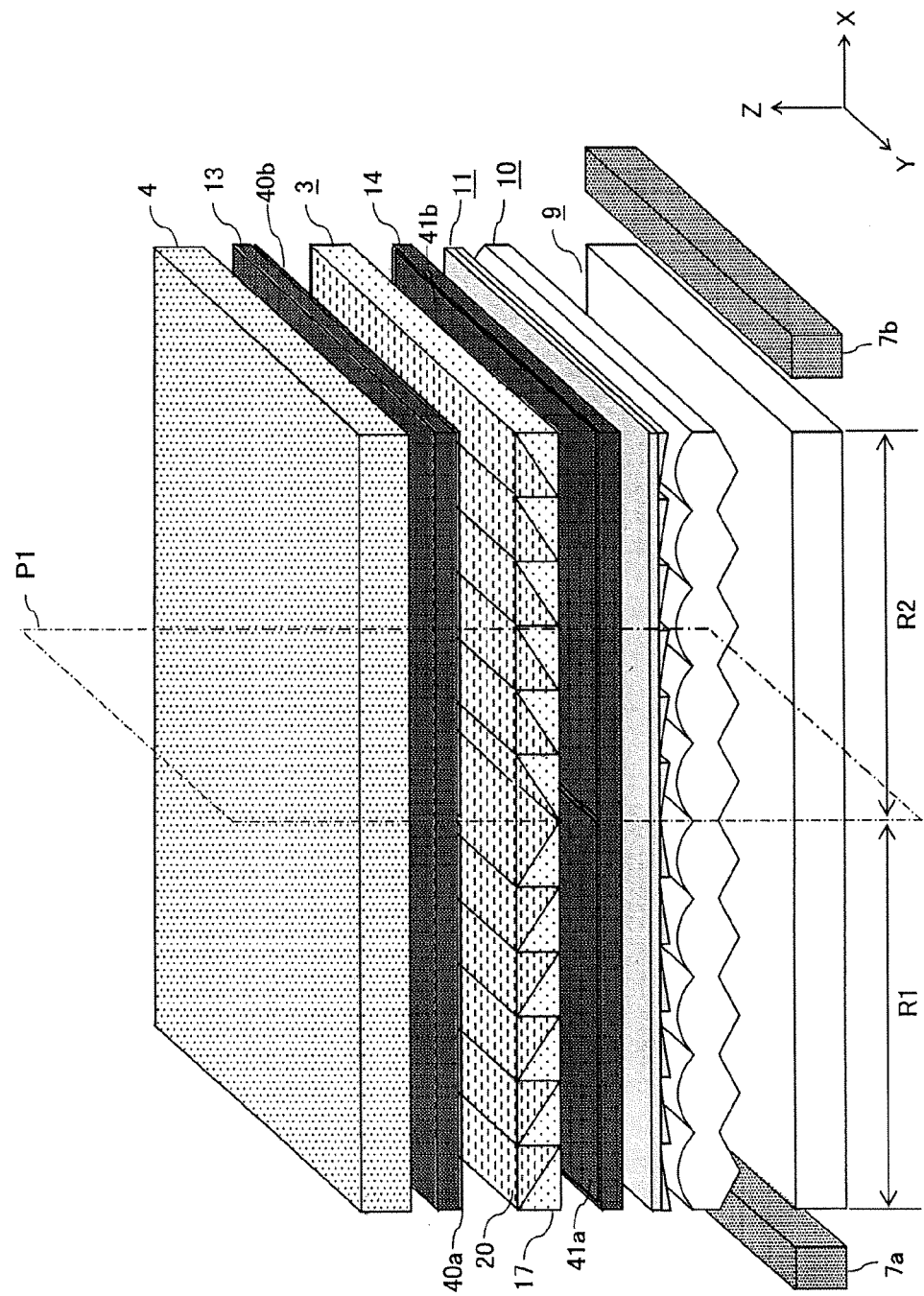
FIG. 1B is an exploded perspective view of a part of the image display apparatus shown in FIG. 1A.

FIG. 1A is a schematic cross-sectional view of an image display apparatus 1 according to an embodiment, and FIG. 1B is an exploded perspective view of a part of the image display apparatus 1 shown in FIG. 1A. It is noted that in FIG. 1A, illustration of electrodes 40a, 40b, 41a, and 41b shown in FIG. 1B is omitted.

In the present embodiment, a three-dimensional orthogonal coordinate system is set for the image display apparatus 1, and a direction is specified by using the coordinate axes. As shown in FIGS. 1A and 1B, an X axis direction coincides with a right-left direction (horizontal direction) when a user faces a display surface of an image display panel 4. A Y axis direction coincides with an up-down direction when the user faces the display surface of the image display panel 4. A Z axis direction coincides with a direction perpendicular to the display surface of the image display panel 4. Here, "facing" means that the user is located directly in front of the display surface such that, for example, when a letter of "A" is displayed on the display surface, the user sees the letter of "A" from a correct direction. In addition, FIGS. 1A and 1B correspond to views as seen from above the image display apparatus 1. Thus, the left side in FIGS. 1A and 1B corresponds to the right side of the display screen when a viewer sees the display screen.

The image display apparatus 1 includes a light source switching type backlight 2, a liquid crystal prism element 3, the image display panel 4 which displays an image for right eye and an image for left eye while alternately switching between the image for right eye and the image for left eye, an offset optical element 11, a position detection section 38 which detects the position of a user who uses the image display apparatus 1, and a control section 6 which controls a liquid crystal driving voltage outputted to the liquid crystal prism element 3, on the basis of information of the detected position of the user. Hereinafter, each component will be described in detail.

The backlight 2 includes light sources 7a and 7b facing each other, a reflection film 8, a light guide plate 9, and a light control film 10. The reflection film 8 is provided on a lower surface side of the light guide plate 9, and the light control film 10 is provided on an upper surface side of the light guide plate 9.

The light sources 7a and 7b are arranged so as to extend along a pair of side surfaces, respectively, of the light guide plate 9, and face each other in the X axis direction. The light source 7a is located at the left side surface of the light guide plate 9, and the light source 7b is located at the right side surface of the light guide plate 9. Each of the light sources 7a and 7b has a plurality of LED elements arranged in the Y axis direction. Each of the light sources 7a and 7b alternately repeats lighting-up and going-out in synchronization with switching between the image for right eye and the image for left eye which are displayed on the image display panel 4. In other words, when the image display panel 4 displays the image for right eye, the light source 7a lights up and the light source 7b goes out, and when the image display panel 4 displays the image for left eye, the light source 7a goes out and the light source 7b lights up.

Light emitted from the light sources 7a and 7b spreads within the light guide plate 9 while being repeatedly totally reflected at the upper surface and the lower surface of the light guide plate 9. Light having an angle exceeding the total reflection angle within the light guide plate 9 is emitted from the upper surface of the light guide plate 9. The lower surface of the light guide plate 9 is composed of a plurality of inclined surfaces 35 as shown in FIGS. 1A and 1B. By these inclined surfaces 35, light propagating within the light guide plate 9 is reflected in various directions, and thus the intensity of the light emitted from the light guide plate 9 becomes uniform across the entire upper surface.

The reflection film 8 is provided on the lower surface side of the light guide plate 9. Light having an angle exceeding the total reflection angles of the inclined surfaces 35 provided in the lower surface of the light guide plate 9 is reflected by the reflection film 8, enters the light guide plate 9 again, and is eventually emitted from the upper surface. The light emitted from the light guide plate 9 is incident on the light control film 10.

On a lower surface of the light control film 10, a plurality of prisms 36 each having a triangular cross section and a ridge line extending in the Y axis direction are aligned along the X axis direction. In other words, on the lower surface of the light control film 10, the prisms 36 each having a triangular cross section are arranged in a one-dimensional array. In addition, on an upper surface of the light control film 10, a plurality of cylindrical lenses 37 extending in the Y axis direction are aligned in the X axis direction. In other words, a lenticular lens is formed on the upper surface of the light control film 10.

The light incident on the lower surface of the light control film 10 is refracted toward the Z axis direction by the prisms 36, converged by the lenticular lens located on the upper surface, and is incident on the liquid crystal prism element 3.

Figures 1C, 2:
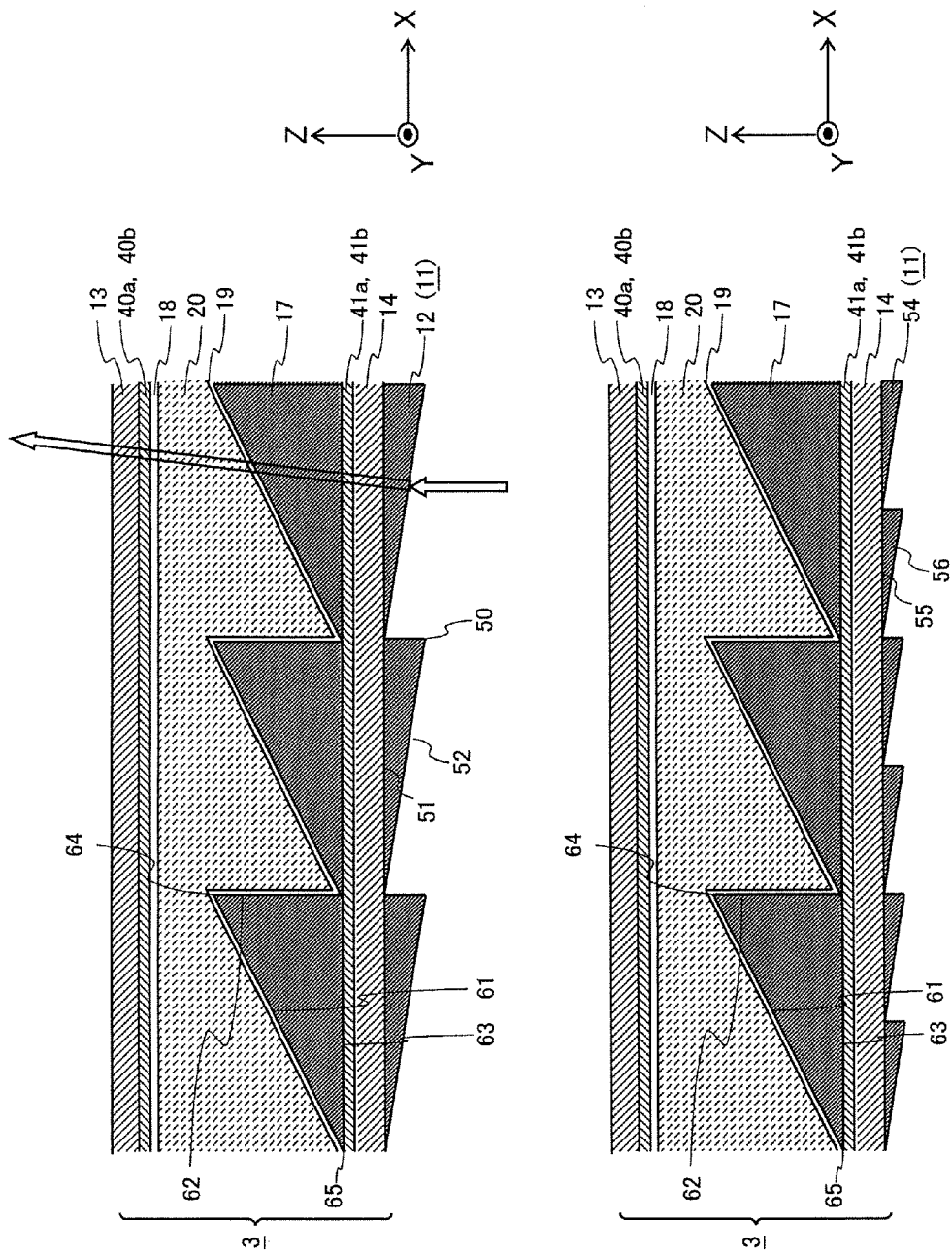
FIG. 1C is a partial enlarged view of a liquid crystal prism element and an offset optical element shown in FIG. 1A.
FIG. 2 is a partial enlarged view showing a modification of the offset optical element.

FIG. 1C is an enlarged view of the liquid crystal prism element and the offset optical element shown in FIG. 1A. Hereinafter, the liquid crystal prism element 3 and the offset optical element 11 will be described in detail with reference to FIGS. 1A to 1C.

The liquid crystal prism element 3 controls a deflection direction such that the light that is emitted from the left-side light source 7a and incident thereon through the light guide plate 9 and the light control film 10 is converged at the position of the right eye of the user. In addition, the liquid crystal prism element 3 controls a deflection direction such that the light that is emitted from the right-side light source 7b and incident thereon through the light guide plate 9 and the light control film 10 is converged at the position of the left eye of the user.

More specifically, the liquid crystal prism element 3 includes a pair of opposing substrates 13 and 14, a plurality of prisms 17 and a liquid crystal layer 20 sealed between the opposing substrates 13 and 14, the electrodes 40a and 40b provided on an inner surface of the opposing substrate 13, the electrodes 41a and 41b provided on an inner surface of the opposing substrate 14, an alignment film 18 provided on the electrodes 40a and 40b, and an alignment film 19 provided on an inclined surface 61 and a side surface 62 of each prism 17. Although not shown in the drawings, a polarizer whose transmission axis extends in the Y axis direction is provided in the image display panel 4. Thus, light of components in vibration directions other than the Y axis direction is absorbed. It is noted that the polarizer may be provided on each of outer surfaces of the opposing substrates 13 and 14.

Each prism 17 is formed in a triangular pole shape having a triangular cross section and a ridge line 64 extending in the Y axis direction, and has the inclined surface 61, the side surface 62, and a bottom surface 63.

As understood from FIGS. 1A and 1B, a plurality of the prisms 17 are provided on the electrodes 41a and 41b so as to be aligned in the X axis direction. Cross-sectional shapes of a plurality of the prisms 17 are formed so as to be bilaterally symmetrical in the entire liquid crystal prism element 3. For facilitating the explanation, the region where the prisms 17 are formed is divided into left and right halves in FIGS. 1A and 1B, the left-side region is indicated by R1, and the right-side region adjacent to the region R1 in the X axis direction is indicated by R2. In addition, a plane that passes through the border line (center line) between the regions R1 and R2 and is orthogonal to the display surface of the image display panel 4 is indicated by P1. The cross-sectional shape of the prisms 17 located in the region R1 and the cross-sectional shape of the prisms 17 located in the region R2 are designed so as to be symmetrical to each other about the plane P1 when seen on a plane parallel to an XZ plane, as shown in FIGS. 1A and 1B.

The electrode 40a is formed in the region R1 of the inner surface of the opposing substrate 13. The electrode 40b is formed in the region R2 of the inner surface of the opposing substrate 13. Similarly, the electrode 41a is formed in the region R1 of the inner surface of the opposing substrate 14, and the electrode 41b is formed in the region R2 of the inner surface of the opposing substrate 14.

Furthermore, the alignment films 18 and 19 which are subjected to orientation treatment for controlling the orientation directions of liquid crystal molecules into a desired direction are provided on the surfaces of the prisms 17 and the electrodes 40a and 40b. The alignment films 18 and 19 orient the liquid crystal molecules such that the long axes of the liquid crystal molecules extend in the Y axis direction in a state where no voltage is applied to the electrodes 40a, 40b, 41a, and 41b. It is noted that the alignment films 18 and 19 may be omitted as long as the orientations of the liquid crystal molecules are kept uniform.

As the materials of the opposing substrates 13 and 14 and the prisms 17, glass or resin can be used. When resin is used as the material of the prisms 17, the prisms 17 can be formed by, as an example, imprinting a UV-curing resin on a glass substrate. The liquid crystal prism element 3 can be produced by forming a one-dimensional array of the prisms 17 on the opposing substrate 14 on which the electrodes 41a and 41b have been formed, then attaching together the opposing substrate 14 and the opposing substrate 13 on which the electrodes 40a and 40b have been formed, and injecting a liquid crystal between the opposing substrates 13 and 14.

The liquid crystal prism element 3 is an element that can control the magnitude of the deflection angle of transmitted light in accordance with the magnitude of a voltage applied from the outside. The principle will be described briefly. In general, a liquid crystal molecule has an ellipsoidal shape and has different dielectric constants in the longitudinal direction and the lateral direction thereof. Thus, the liquid crystal layer 20 has a birefringence property in which a refractive index is different for each polarization direction of incident light. In addition, when the direction of the orientation (director) of each liquid crystal molecule relatively changes with respect to the polarization direction of light, the refractive index of the liquid crystal layer 20 also changes. Thus, when the orientation of the liquid crystal is changed by an electric field generated by applying a certain voltage, the refractive index for transmitted light changes, and thus a deflection angle which is a refraction angle of the light changes.

In the present embodiment, a case where uniaxial positive type liquid crystal is used as the material forming the liquid crystal layer 20 will be considered. Then, a case where the liquid crystal molecules are oriented in the Y axis direction when no voltage is applied as described above and a case where the liquid crystal molecules are oriented in the Z axis direction when a voltage is applied will be considered.

Since the transmission axis of the image display panel 4 extends in the Y axis direction, the refractive index of the liquid crystal layer 20 when no voltage is applied is an extraordinary light refractive index, and the refractive index of the liquid crystal layer 20 when a voltage is applied is an ordinary light refractive index.

In general, in the case where light is deflected by an active element such as the liquid crystal prism element 3, it is desirable to use a liquid crystal material having high Δn (=refractive index ne for extraordinary light–refractive index no for ordinary light), in order to increase a deflection angle. However, among commercially available materials, the number of liquid crystal materials having high Δn is small, and Δn is generally about 0.2.

In addition, even when the liquid crystal prism is formed using the same liquid crystal material, design of the orientation direction and a manner of applying an electric field are important items that have a great influence on the element performance, which is the ability of the liquid crystal prism element, such as a deflection angle, electric power, or a switching speed.

It is noted that in the liquid crystal prism element 3, the inclination directions of the inclined surfaces of the prisms 17 are different between the right and left sides of the center line of the screen (the plane P1). The liquid crystal prism element 3 has a property in which the efficiency of deflection toward a direction in which emitted light becomes close to the inclined surface of each prism 17 (an upper right direction in FIG. 1C) is low as compared to that of deflection toward a direction in which emitted light becomes more distant from the inclined surface of each prism 17 (an upper left direction in FIG. 1C). Thus, when the inclined surfaces of the prisms 17 are made symmetrical about the plane P1 and are also made to face ahead of the center portion of the screen, the liquid crystal prism element 3 can efficiently deflect light incident near the left edge of the screen, toward ahead of the screen on the right, and can efficiently deflect light incident near the right edge of the screen, toward ahead of the screen on the left.

In this case, different voltages are applied to the right and left regions of the liquid crystal prism element 3. Thus, the electrodes 40a and 40b and the electrodes 41a and 41b are separated at the center of the screen. When both electrodes in the same substrate are used as ground terminals, the electrodes may not be separated at the center.

The offset optical element 11 is provided between the image display panel 4 and the backlight device 2, and deflects light incident thereon by a predetermined angle. In an example shown in FIG. 1C, the offset optical element 11 is composed of a plurality of prisms 12 formed on the outer surface of the opposing substrate 14. Each of the prisms 12 includes a ridge line 50 extending in the Y axis direction, a bottom surface 51 parallel with the XY plane, and an inclined surface 52 facing toward the backlight device 2 side. The inclination of the inclined surface 52 of the prism 12 is designed such that the height of the prism 12 from the bottom surface 51 to the inclined surface 52 thereof in the Z axis direction, that is, the thickness of the prism 12 continuously decreases toward the center side of the image display panel 4 in the right-left direction. It is noted that the inclination of the inclined surface 61 of the prism 17 composing the liquid crystal prism element 3 is also designed such that the height of the prism 17 from the bottom surface 63 to the inclined surface 61 thereof in the Z axis direction, that is, the thickness of the prism 17 continuously decreases toward the center side of the image display panel 4 in the right-left direction. Therefore, the above configuration can also be expressed that the inclination of the inclined surface 52 of the prism 12 and the inclination of the inclined surface 61 of the prism 17 are inverse from each other with respect to the XY plane parallel with the image display panel 4.

The offset optical element 11 refracts light incident thereon from the normal line direction of the opposing substrate 14, at the interface between the inclined surface 52 and air, thereby deflecting the optical path of light to be incident on the inclined surface 61 of the prism 17 by a predetermined angle. That is, the offset optical element 11 has a function of offsetting the optical path of light to be incident on the inclined surface of the prism 17 by a predetermined angle with respect to the normal line of the opposing substrate 14.

In order to realize an image display apparatus capable of converging light so as to follow an observer of a stereoscopic display or the like, it is necessary to select the material of the prism 17 so as to have a refractive index approximately in the middle between the upper limit value and the lower limit value of the refractive index of the liquid crystal material such that the range allowing the convergence position to follow the observer is bilaterally symmetrical with respect to the front position of the display apparatus. As a specific example, at present, the range of the refractive index of a general liquid crystal material is 1.5 to 1.7. Therefore, as the material of the prism 17, it is necessary to select a material having a refractive index of about 1.6. In addition, if ease of molding is also considered, the material of the prism 17 is preferably resin.

However, among currently available resin materials, most of materials that are suitable for molding of the prism 17 and can be used at low cost have a refractive index of about 1.5. There is a problem that materials suitable for molding of the prism 17 and having a refractive index of 1.6 or higher are expensive and the types thereof are limited.

In addition, in the case where the liquid crystal prism element 3 is employed for the image display apparatus as described above, the variable range of the refractive index of the liquid crystal material is preferably as wide as possible in order that the range allowing the eye position of the observer to be followed can be made as wide as possible. However, if a material having a wide variable range of the refractive index of the liquid crystal material is selected, in order to keep the symmetry of the convergence enabled range, it is necessary to further increase the refractive index of the material of the prism 17 in accordance with the refractive index range of the liquid crystal material, resulting in further increase in the cost of materials.

Thus, in the case where the range of the emission angle of light is controlled so as to be bilaterally symmetrical by only the prism 17 and the liquid crystal layer 20, it is necessary to select the material of the prism 17 and the material of the liquid crystal layer 20 so as to make the refractive index of the material of the prism 17 fall within a range between the lower limit value and the upper limit value of the refractive index of the liquid crystal material. However, by reasons such as limitation of the types of materials (in particular, the material of the prism 17) and increase in the material cost, it is difficult to form the liquid crystal prism element having a desired emission angle property at low cast.

On the other hand, in the configuration of offsetting the incidence angle on the prism 17 by providing the offset optical element 11 as in the present disclosure, as compared to the case of not providing the offset optical element 11, it becomes possible to enlarge rightward or leftward the emission range of light emitted from the liquid crystal prism element 3, irrespective of the refractive index of the material of the prism 17. Therefore, according to the present disclosure, the image display apparatus having the liquid crystal prism element 3 can be realized at low cost using a desired material, without restriction of the types and the cost of the materials of the prism 17 and the liquid crystal layer 20.

It is noted that the prism 12 composing the offset optical element 11 may be molded integrally with the opposing substrate 14 and the prism 17, or may be molded integrally only with the opposing substrate 14. In addition, the prism 12 composing the offset optical element 11 may be formed as a separate unit from the opposing substrate 14 and the prism 17. In this case, a plurality of liquid crystal prisms 12 may be formed as a separate sheet from the opposing substrate 14.

In addition, the offset optical element 11 can be formed by using any material of resin or glass. It is noted that employing resin has an advantage of facilitating the molding of the prism 12.

Further, in an example shown in FIG. 1C, the prism 12 composing the offset optical element 11 is formed so as to have a cross section of right triangle shape, and the entire surface opposing the backlight device 2 is formed as the inclined surfaces 52. However, as in Embodiment 3 described later, the prism may have an inclined surface on a part of the incidence-side surface thereof.

Further, in an example shown in FIG. 1C, the offset optical element 11 is located between the liquid crystal prism element 3 and the backlight device 2. However, as in Embodiment 4 described later, the offset optical element 11 may be located between the liquid crystal prism element 3 and the image display panel 4.

In addition, in an example shown in FIG. 1C, the prism 17 of the liquid crystal prism element 3 and the prism 12 of the offset optical element 11 are each formed such that the height thereof from the bottom surface to the inclined surface decreases toward the center of the image display panel 4 in the right-left direction. In another modification, the prism of the offset optical element 11 may be formed such that the height thereof from the bottom surface to the inclined surface (the thickness in the Z axis direction) continuously increases toward the center of the image display panel in the right-left direction. According to this configuration, even if a material having an extremely high refractive index (for example, a material having a refractive index close to the upper limit value of the refractive index of the liquid crystal material) is selected as the material of the offset optical element 11, similarly, it is possible, in principle, to adjust the range of the emission angle of light emitted from the liquid crystal prism element 3 to be bilaterally symmetrical.

In an example shown in FIG. 1C, the prisms 17 composing the liquid crystal prism element 3 and the prisms 12 composing the offset optical element 11 respectively correspond to each other on a one-to-one basis. However, a plurality of prisms 12 may be provided for one prism 17. This example is shown in FIG. 2.

FIG. 2 is a partial enlarged view showing a modification of the offset optical element and showing a part corresponding to FIG. 1C.

In the offset optical element 11 shown in FIG. 2, two prisms 54 are located for one prism 17. The prism 54 has a bottom surface 55 parallel with the XY plane, and an inclined surface 56 facing the backlight device 2 side. The inclination of the inclined surface 56 of the prism 54 is designed such that the height of the prism 54 from the bottom surface 55 to the inclined surface 56 thereof in the Z axis direction, that is, the thickness of the prism 54 continuously decreases toward the center side of the image display panel 4 in the right-left direction.

Thus, by providing a plurality of prisms 54 for one prism 17, the thickness of the offset optical element 11 can be further decreased. Therefore, the modification shown in FIG. 2 is advantageous for decreasing the thickness of the entire image display apparatus.

In FIG. 2, a plurality of prisms 54 are provided for one prism 17. However, the offset optical element may be formed such that three or more prisms are provided for one prism 17.

Light transmitted through the liquid crystal prism element 3 is incident on the image display panel 4. One example of the image display panel 4 is an in-plane-switching type panel. However, another type of image display panel can be used as the image display panel 4. Light transmitted through the image display panel 4 has directivity and is converged at the position of an eye of the viewer.

The image display apparatus 1 switches between the light sources 7a and 7b in synchronization with switching between the image for right eye and the image for left eye. In addition, when the switching between the image for right eye and the image for left eye is performed at a frequency equal to or higher than 120 Hz, the user can recognize a stereoscopic image on the basis of the image for right eye and the image for left eye.

The position detection section 38 includes a camera 5 and a viewing position calculation section 39. The camera 5 takes an image of the user in predetermined cycles. The viewing position calculation section 39 analyzes the image taken by the camera 5 and calculates viewing position information representing a viewing position of the user. For image analysis performed by the camera 5, a known algorithm for recognizing the position of a face or a portion (eyes, nose, etc.) of a face can be used. In addition, the viewing position information calculated by the viewing position calculation section 39 preferably represents the positions of the eyes of the user, but may represent the position of the face, the nose, or the like instead of the positions of the eyes.

The control section 6 controls the value of a voltage applied to the liquid crystal prism element 3, on the basis of the viewing position information calculated by the viewing position calculation section 39. More specifically, when the viewing position of the user shifts from a position in front of the screen center to the left edge side as shown in FIG. 1A, the light emitted from each prism 17 is deflected in the right direction as seen from the user, by making the refractive index of the liquid crystal layer 20 lower than the refractive index of each prism 17 in the region R1 and making the refractive index of the liquid crystal layer 20 higher than the refractive index of each prism 17 in the region R2. At that time, the deflection angle in the region R1 and the deflection angle in the region R2 can be adjusted by making the voltage applied to the region R1 higher than a voltage applied when light is not deflected and making the voltage applied to the region R2 lower than the voltage applied when light is not deflected. In contrast, when the viewing position of the user shifts from a position in front of the screen center to the right edge side, the light emitted from each prism 17 is deflected in the left direction as seen from the user, by making the refractive index of the liquid crystal layer 20 higher than the refractive index of each prism 17 in the region R1 and making the refractive index of the liquid crystal layer 20 lower than the refractive index of each prism 17 in the region R2. At that time, the deflection angle in the region R1 and the deflection angle in the region R2 can be adjusted by making the voltage applied to the region R1 lower than the voltage applied when light is not deflected and making the voltage applied to the region R2 higher than the voltage applied when light is not deflected.

It is noted that the deflection angle of the liquid crystal prism element 3 and position information of a converged point of light with respect to an applied voltage can be assumed at the stage of designing, and thus it suffices to previously prepare data that associates an applied voltage with position information and to store the data in a storage unit provided in the image display apparatus 1. In addition, after completion of a product, calibration may be performed to correct the position of a light converged point.

By repeating the above-described deflection control on the basis of the viewing position information in predetermined cycles, it becomes possible for the viewer to view a stereoscopic image at an arbitrary location even when the viewer freely moves relative to the image display apparatus 1. Thus, according to the present disclosure, by providing the offset optical element 11, the image display apparatus that can follow the position of the viewer within a bilaterally symmetrical range can be realized at low cost using a desired material without limitation of the types or the cost of the materials of the prism 17 and the liquid crystal layer 20. In addition, by converging light at the position of an eye of the viewer, a high-brightness and energy-saving image display apparatus 1 can be realized.

In the present embodiment, the light guide plate is shared by the light sources 7a and 7b. However, a light guide plate for the light source 7a and a light guide plate for the light source 7b may be provided so as to be laminated on each other.

In addition, instead of the control film 10 in which the prisms and the lenticular lens are integrated, a prism sheet and a lenticular lens sheet may be individually provided.

Furthermore, the backlight 2 is not limited to have the configuration shown in FIGS. 1A and 1B, and may have another configuration as long as it can alternately emit light for right eye and light for left eye in a time division manner in synchronization with switching between right and left image signals.

Furthermore, in the present embodiment, the directions of the inclined surfaces of the prisms 17 in the liquid crystal prism element 3 are made different between the regions R1 and R2, and the inclined surfaces of the prisms 17 are formed so as to be symmetrical about the plane P1. However, the directions of the inclined surfaces of the prisms may be uniform in the entire liquid crystal prism element 3. In this case, instead of providing the separate electrodes in the regions R1 and R2 of the liquid crystal prism element 3 as in the present embodiment, a single electrode is provided over the entire display screen. However, it is more preferred to provide the prisms 17 and the electrodes separately in the two regions R1 and R2, in terms of the deflection angle and transmission efficiency of a light beam with respect to orientation change.

Furthermore, the present embodiment has been described with, as an example, a stereoscopic image display apparatus that displays, in a time division manner, an image for right eye and an image for left eye that have a parallax. However, an image having no parallax may be displayed. In this case, the light sources 7a and 7b are constantly lit up instead of being alternately lit up. As well as the case of displaying a three-dimensional image, in the case of displaying a two-dimensional image, not only energy saving can be attained but also the displayed content can be prevented from being seen by surrounding people and privacy protection can also be improved, by following movement of the viewer and projecting a reduced image only on the eyes of the viewer and the vicinity thereof.

Furthermore, in the present embodiment, the liquid crystal prism element 3 is formed by sealing the prisms 17 and the liquid crystal layer 20 between the opposing substrates 13 and 14. However, prisms which deflect incident light and a liquid crystal element which changes a deflection angle of emitted light in accordance with a voltage applied thereto may be separately provided.

Furthermore, in the example shown in FIG. 1C, the electrode layer is provided on the inner surface of the opposing substrate 14. However, the electrode layer may be provided on the inclined surface 61 and the side surface 62 of each prism 17, or may be provided on the inclined surface 56 and the side surface of each prism 54.

<2. Detailed Configuration of Liquid Crystal Prism Element and Offset Optical Element>

Hereinafter, the configurations of liquid crystal prism elements and offset optical elements according to Embodiments 1 to 4 will be described in detail with reference to FIGS. 3 to 6.

(Embodiment 1)

Figure 3:
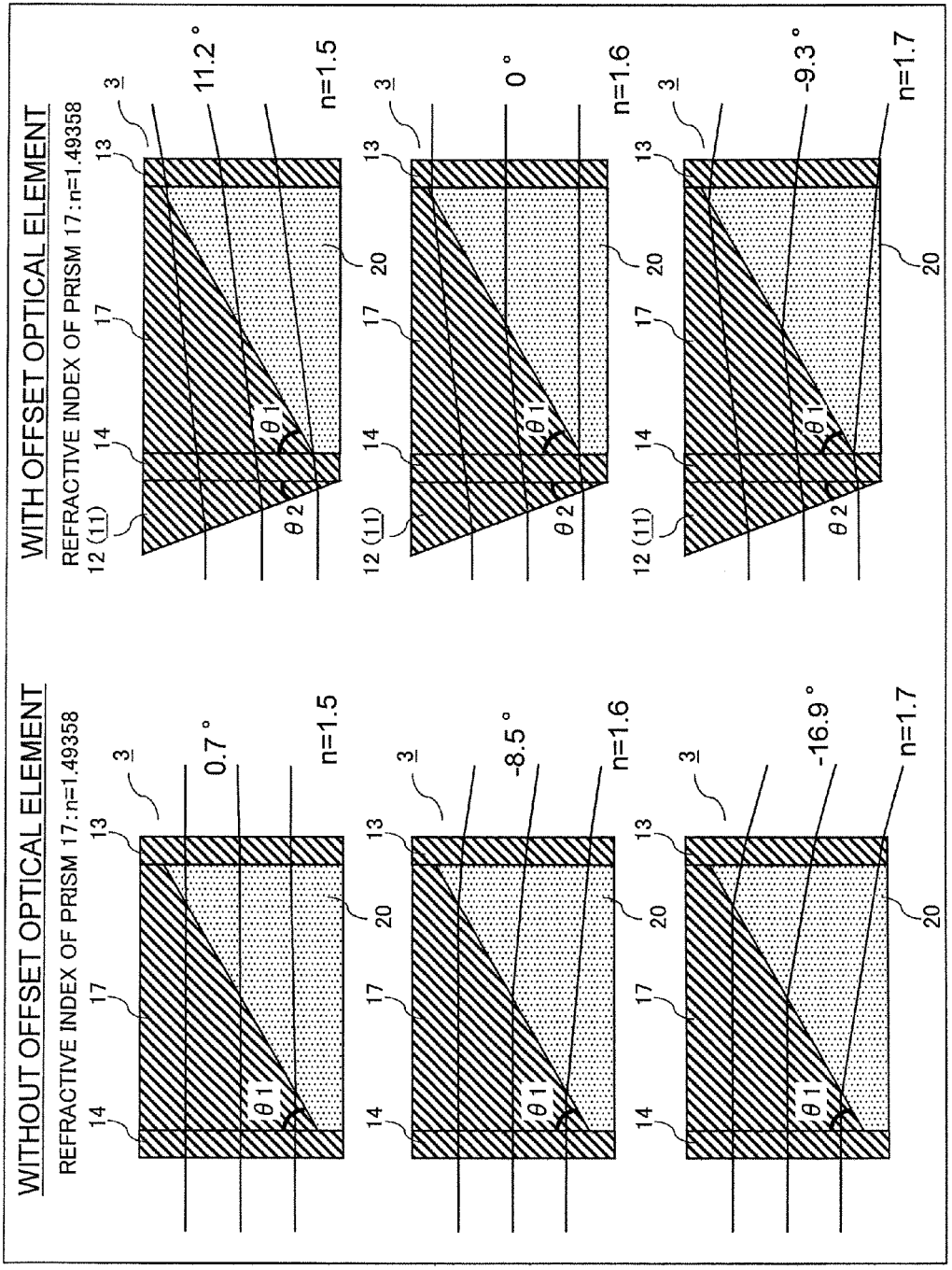
FIG. 3 is an optical path diagram of the liquid crystal prism element and the offset optical element according to Embodiment 1.

FIG. 3 is an optical path diagram of the liquid crystal prism element and the offset optical element according to Embodiment 1. In FIG. 3, optical path diagrams of light transmitted only through a liquid crystal prism element are shown in the left column, and optical path diagrams of light transmitted through the offset optical element and the liquid crystal prism element according to Embodiment 1 are shown in the right column. In addition, in FIG. 3, optical path diagrams in the case where the refractive index of the liquid crystal layer takes the lower limit value are shown on the upper stage, optical path diagrams in the case where the refractive index of the liquid crystal layer takes the middle value between the upper limit value and the lower limit value are shown on the middle stage, and optical path diagrams in the case where the refractive index of the liquid crystal layer takes the upper limit value are shown on the lower stage. Here, for convenience of description, the sign of the emission angle formed by emitted light with respect to the normal line of a substrate of the liquid crystal prism element is assumed to be positive when light is deflected upward in FIG. 3.

In an example shown in FIG. 3, acrylic resin is used as the materials of the opposing substrates 13 and 14 and the prisms 12 and 17. The refractive index of the acrylic resin for light having a wavelength of 550 nm is 1.49358. An inclination angle $\theta 1$ of the inclined surface of the prism 17 is 60°, and an inclination angle θ2 of the inclined surface of the prism 12 is 23.5°. In addition, the variation range of the refractive index of the liquid crystal layer 20 is 1.5 to 1.7.

As shown in the left column in FIG. 3, in the case of using only the liquid crystal prism element 3, the emission angle of light with respect to the normal line of the opposing substrate 13 is −16.9° to +0.7°. In this case, the liquid crystal prism element 3 can deflect a beam only in a range from substantially horizontal direction to lower-right direction (as seen from the image display apparatus, from the front to right side of the screen). In order to resolve this, for example, the prism 17 may be formed by using a material having a high refractive index, that is, a refractive index of 1.6 which is the middle value of the liquid crystal material. However, as described above, no such materials can be used as a resin material, or such materials are limited to extremely expensive ones.

On the other hand, as shown in the right column in FIG. 3, in the case where the offset optical element 11 is provided and the inclination angle of the inclined surface is set at 23.5°, the emission angle of light with respect to the normal line of the opposing substrate 13 is −9.3° to +11.2°. When the middle value of the refractive index of the liquid crystal material is controlled to be 1.6, a beam emitted from the liquid crystal prism element 3 becomes substantially horizontal. Therefore, by changing the voltage applied to the liquid crystal prism element 3, the beam can be deflected such that a range of the emission angle of the beam is symmetrical in the up-down direction in FIG. 3 (as seen from the display, bilaterally symmetrical).

(Embodiment 2)

Figure 4:
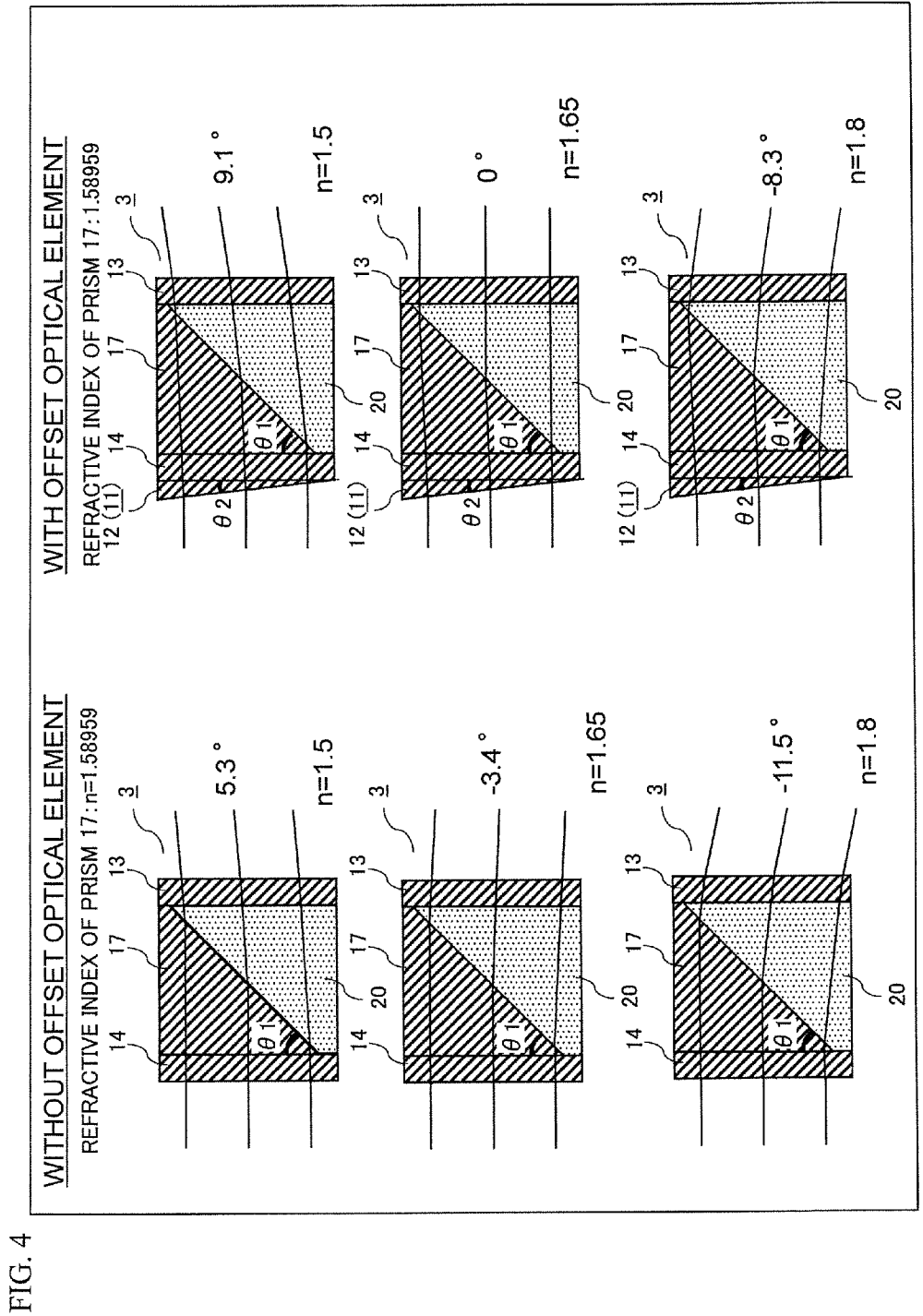
FIG. 4 is an optical path diagram of a liquid crystal prism element and an offset optical element according to Embodiment 2.

FIG. 4 is an optical path diagram of the liquid crystal prism element and the offset optical element according to Embodiment 2. In FIG. 4, optical path diagrams of light transmitted only through a liquid crystal prism element are shown in the left column, and optical path diagrams of light transmitted through the offset optical element and the liquid crystal prism element according to Embodiment 2 are shown in the right column. In addition, in FIG. 4, optical path diagrams in the case where the refractive index of the liquid crystal layer takes the lower limit value are shown on the upper stage, optical path diagrams in the case where the refractive index of the liquid crystal layer takes the middle value between the upper limit value and the lower limit value are shown on the middle stage, and optical path diagrams in the case where the refractive index of the liquid crystal layer takes the upper limit value are shown on the lower stage. Here, for convenience of description, the sign of the emission angle formed by emitted light with respect to the normal line of a substrate of the liquid crystal prism element is assumed to be positive when light is deflected upward in FIG. 4.

In an example shown in FIG. 4, polycarbonate is used as the materials of the opposing substrates 13 and 14 and the prisms 12 and 17. The refractive index of the polycarbonate for light having a wavelength of 550 nm is 1.58959. An inclination angle θ1 of the inclined surface of the prism 17 is 45°, and an inclination angle θ2 of the inclined surface of the prism 12 is 6°. In addition, the variation range of the refractive index of the liquid crystal layer 20 is 1.5 to 1.8.

As shown in the left column in FIG. 4, in the case of using only the liquid crystal prism element 3, the emission angle of light with respect to the normal line of the opposing substrate 13 is −11.5° to +5.3°. In this case, the liquid crystal prism element 3 can deflect a beam only in a range from substantially horizontal direction to lower-right direction (as seen from the image display apparatus, from the front to right side of the screen).

On the other hand, as shown in the right column in FIG. 4, in the case where the offset optical element 11 is provided and the inclination angle of the inclined surface is set at 6°, the emission angle of light with respect to the normal line of the opposing substrate 13 is −8.3° to +9.1°. When the middle value of the refractive index of the liquid crystal material is controlled to be 1.65, a beam emitted from the liquid crystal prism element 3 becomes substantially horizontal. Therefore, by changing the voltage applied to the liquid crystal prism element 3, a range of the emission angle of the beam can be made substantially symmetrical in the up-down direction in FIG. 4 (as seen from the display, bilaterally symmetrical).

(Embodiment 3)

Figure 5:
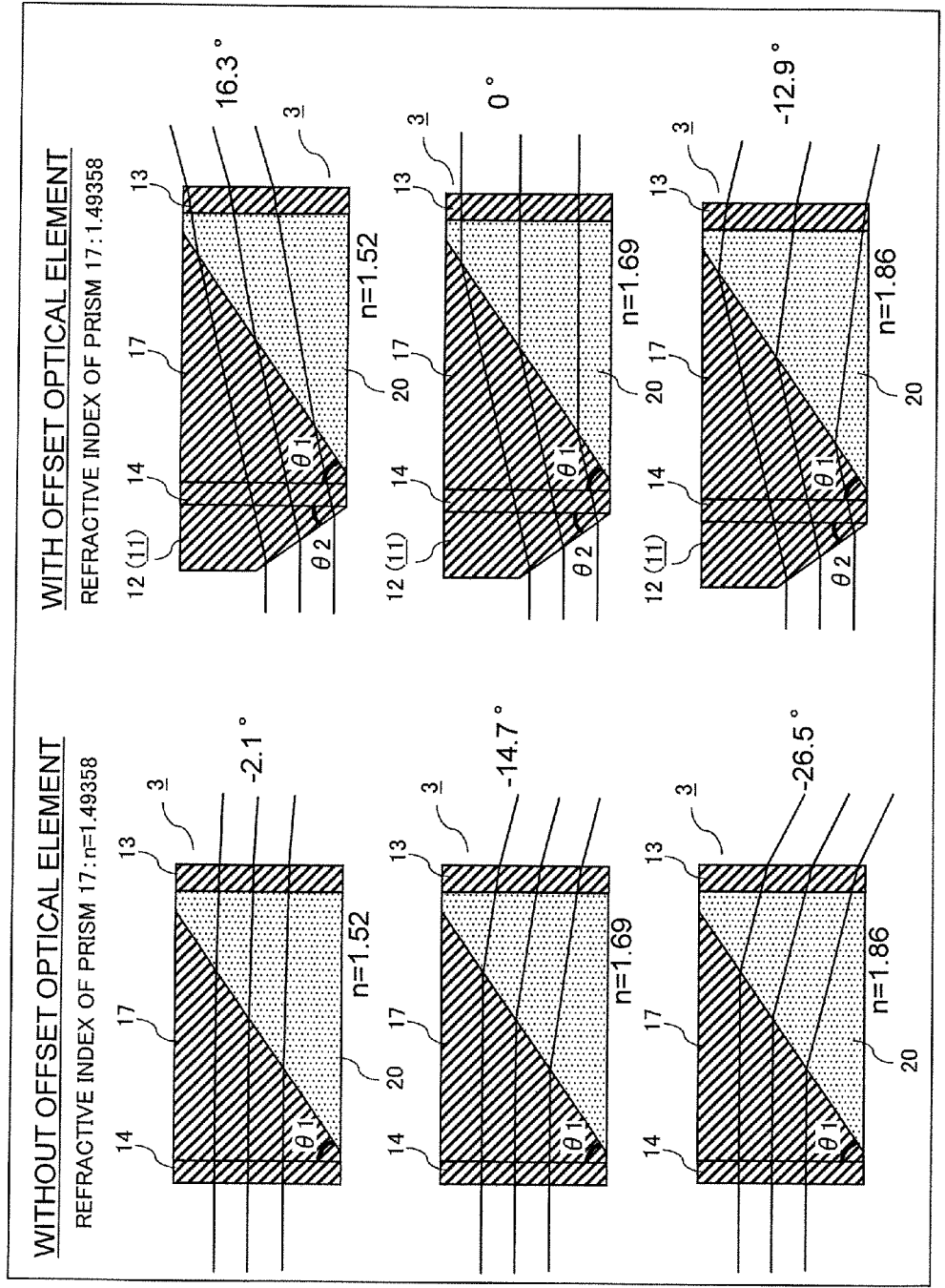
FIG. 5 is an optical path diagram of a liquid crystal prism element and an offset optical element according to Embodiment 3.

FIG. 5 is an optical path diagram of the liquid crystal prism element and the offset optical element according to Embodiment 3. In FIG. 5, optical path diagrams of light transmitted only through a liquid crystal prism element are shown in the left column, and optical path diagrams of light transmitted through the offset optical element and the liquid crystal prism element according to Embodiment 3 are shown in the right column. In addition, in FIG. 5, optical path diagrams in the case where the refractive index of the liquid crystal layer takes the lower limit value are shown on the upper stage, optical path diagrams in the case where the refractive index of the liquid crystal layer takes the middle value between the upper limit value and the lower limit value are shown on the middle stage, and optical path diagrams in the case where the refractive index of the liquid crystal layer takes the upper limit value are shown on the lower stage. Here, for convenience of description, the sign of the emission angle formed by emitted light with respect to the normal line of a substrate of the liquid crystal prism element is assumed to be positive when light is deflected upward in FIG. 5.

In an example shown in FIG. 5, acrylic resin is used as the materials of the opposing substrates 13 and 14 and the prisms 12 and 17. The refractive index of the acrylic resin for light having a wavelength of 550 nm is 1.49358. An inclination angle θ1 of the inclined surface of the prism 17 is 55°, and an inclination angle θ2 of the inclined surface of the prism 12 is 36.3°. In addition, the variation range of the refractive index of the liquid crystal layer 20 is 1.52 to 1.86.

As shown in the left column in FIG. 5, in the case of using only the liquid crystal prism element 3, the emission angle of light with respect to the normal line of the opposing substrate 13 is −26.5° to −2.1°. In this case, the liquid crystal prism element 3 can deflect a beam only in a range from substantially horizontal direction to lower-right direction (as seen from the image display apparatus, from the front to right side of the screen).

On the other hand, as shown in the right column in FIG. 5, in the case where the offset optical element 11 is provided and the inclination angle of the inclined surface is set at 36.3°, the emission angle of light with respect to the normal line of the opposing substrate 13 is −12.9° to +16.3°. When the middle value of the refractive index of the liquid crystal material is controlled to be 1.69, a beam emitted from the liquid crystal prism element 3 becomes substantially horizontal. Therefore, by changing the voltage applied to the liquid crystal prism element 3, a range of the emission angle of the beam can be made substantially symmetrical in the up-down direction in FIG. 5 (as seen from the display, bilaterally symmetrical).

The offset optical element 11 according to the present embodiment is different from those of Embodiments 1 and 2 in that the inclined surface is formed on a part of the input-side surface of the prism 12. In the configuration of the present embodiment, since the deflection angle by the offset optical element 11 is large, vignetting of light by the liquid crystal prism element 3 occurs. Therefore, it is not necessary to form the inclined surface over the entire incident-side surface of each prism 12, but the inclined surface is to be formed only on an effective part of the liquid crystal prism element 3. By this configuration, the thicknesses of the offset optical element 11 and the entire image display apparatus can be decreased.

(Embodiment 4)

Figure 6:
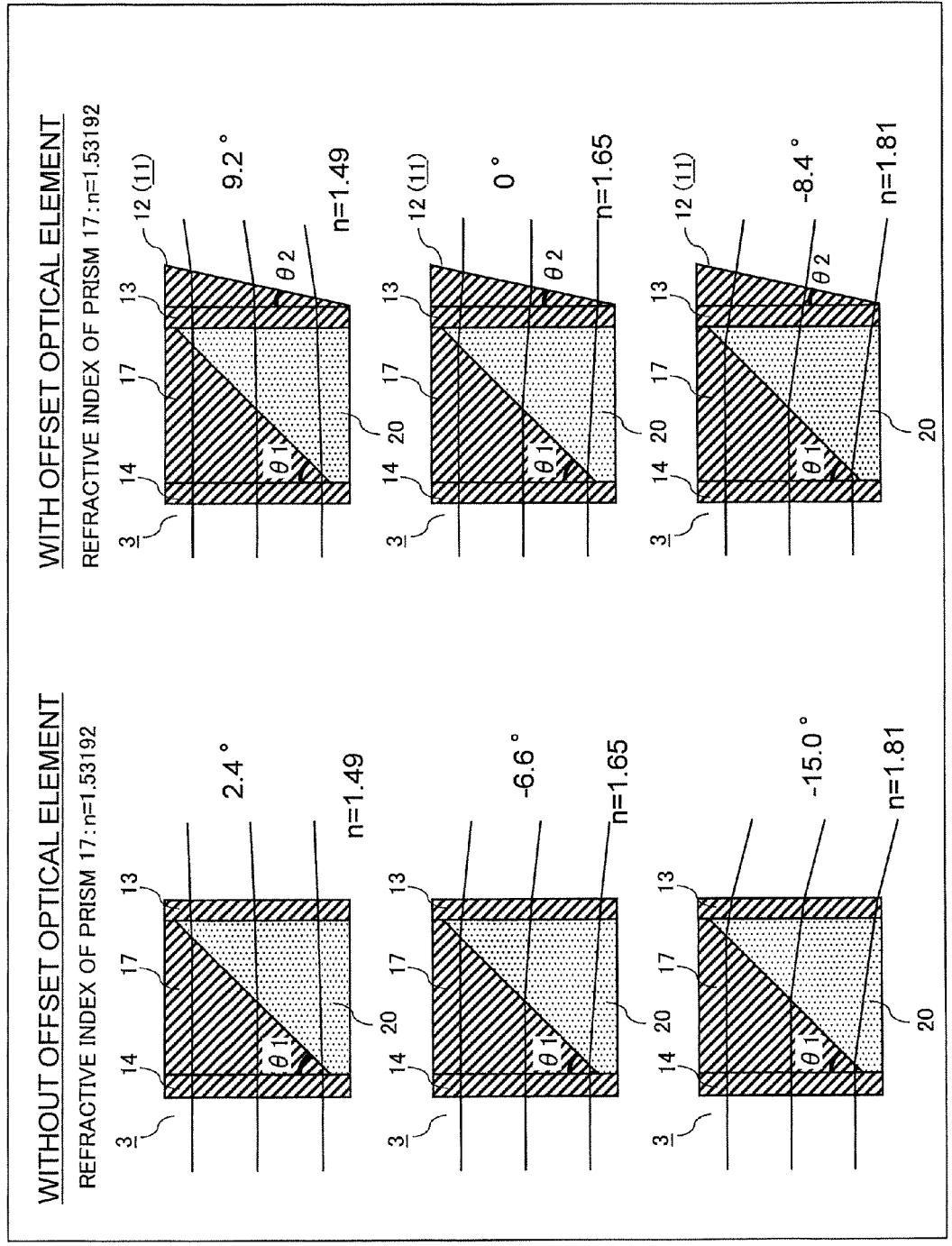
FIG. 6 is an optical path diagram of a liquid crystal prism element and an offset optical element according to Embodiment 4.

FIG. 6 is an optical path diagram of the liquid crystal prism element and the offset optical element according to Embodiment 4. In FIG. 6, optical path diagrams of light transmitted only through a liquid crystal prism element are shown in the left column, and optical path diagrams of light transmitted through the offset optical element and the liquid crystal prism element according to Embodiment 4 are shown in the right column. In addition, in FIG. 6, optical path diagrams in the case where the refractive index of the liquid crystal layer takes the lower limit value are shown on the upper stage, optical path diagrams in the case where the refractive index of the liquid crystal layer takes the middle value between the upper limit value and the lower limit value are shown on the middle stage, and optical path diagrams in the case where the refractive index of the liquid crystal layer takes the upper limit value are shown on the lower stage. Here, for convenience of description, the sign of the emission angle formed by emitted light with respect to the normal line of a substrate of the liquid crystal prism element is assumed to be positive when light is deflected upward in FIG. 6.

In an example shown in FIG. 6, cyclic olefin copolymer is used as the materials of the opposing substrates 13 and 14 and the prisms 12 and 17. The refractive index of the cyclic olefin copolymer for light having a wavelength of 550 nm is 1.53192. An inclination angle θ1 of the inclined surface of the prism 17 is 45°, and an inclination angle θ2 of the inclined surface of the prism 12 is 12.2°. In addition, the variation range of the refractive index of the liquid crystal layer 20 is 1.49 to 1.81.

As shown in the left column in FIG. 6, in the case of using only the liquid crystal prism element 3, the emission angle of light with respect to the normal line of the opposing substrate 13 is −15.0° to +2.4°. In this case, the liquid crystal prism element 3 can deflect a beam only in a range from substantially horizontal direction to lower-right direction (as seen from the image display apparatus, from the front to right side of the screen).

On the other hand, as shown in the right column in FIG. 6, in the case where the offset optical element 11 is provided and the inclination angle of the inclined surface is set at 12.2°, the emission angle of light with respect to the normal line of the opposing substrate 13 is −8.4° to +9.2°. When the middle value of the refractive index of the liquid crystal material is controlled to be 1.65, a beam emitted from the liquid crystal prism element 3 becomes substantially horizontal. Therefore, by changing the voltage applied to the liquid crystal prism element 3, the beam can be deflected in a substantially symmetrical manner in the up-down direction in FIG. 6 (as seen from the display, bilaterally symmetrical).

The offset optical element 11 according to the present embodiment is located on the outer surface of the opposing substrate 13, that is, on the image display panel side. Also in the case of employing this configuration, by deflecting the emission range of a beam by a predetermined angle by using the offset optical element 11, it becomes possible to control the range of the emission angle of the beam so as to be bilaterally symmetrical with respect to the front position of the screen.

It is noted that the emission angle of a beam when the refractive index of the liquid crystal element takes the middle value does not necessarily need to be 0°. The angle of the prism 12 of the offset optical element 11 may be set so as to make the range of the emission angle of a beam bilaterally symmetrical.

The image display apparatus according to the present disclosure automatically deflects a light beam to the position of the viewer on the basis of the position information of the viewer, thus realizing an image display apparatus with high brightness, high efficiency, and high resolution, and is widely applicable not only to use of displaying a three-dimensional image but also to use of displaying a two-dimensional image. In addition, the present disclosure is applicable to a 3D liquid crystal display apparatus, a privacy display, and the like by a simple configuration.

As presented above, one embodiment has been described as an example of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiment has been described to exemplify the technology according to the present disclosure, and therefore, various modifications, replacements, additions, and omissions may be made within the scope of the claims and the scope of the equivalents thereof.

What is claimed is:

1. An image display apparatus comprising:
   an image display panel;
   a backlight device located on a back surface side of the image display panel;
   a first optical element located between the image display panel and the backlight device and including a first deflection element having a plurality of first optical parts and a second deflection element, each of the plurality of first optical parts having a predetermined inclination and being configured to deflect light incident thereon, the second deflection element being configured to change a deflection direction of light incident on the first optical element by changing a refractive index of the second deflection element in accordance with a voltage applied thereto;
   a second optical element located between the image display panel and the first optical element, the second optical element having a plurality of second optical parts, each of the plurality of second optical parts having a predetermined inclination and being configured to deflect light incident thereon;
   a position detection section configured to detect a position of a user; and
   a control section configured to control the voltage applied to the second deflection element, on the basis of information about the position of the user detected by the position detection section, wherein:
   in a case where a right-left direction when the user faces a display surface of the image display panel is defined as an X direction and a direction perpendicular to the display surface of the image display panel is defined as a Z direction, a thickness in the Z direction of each of the plurality of second optical parts continuously decreases toward a center of the second optical element along the X direction, a thickness in the Z direction of each of the plurality of first optical parts continuously decreases toward a center of the first optical element along the X direction, the plurality of second optical parts is a plurality of first prisms each having an inclined first surface facing the backlight device side, a second surface facing the image display panel side and a third surface, the inclined first surface, the second surface and the third surface forming a triangle in a cross section of an X-Z plane, an width of the inclined first surface along the X direction being greater than the second and third surfaces, a thickness defined by the inclined first surface and the second surface of each of the plurality of first prisms in the Z direction decreasing toward a center of the image display panel in the X direction, and the plurality of first optical parts is a plurality of second prisms each having a inclined first surface facing the image display panel side, a second surface facing the backlight device side and a third surface, the inclined first surface, the second surface and the third surface forming a triangle in a cross section of an X-Z plane, an width of the inclined first surface along the X direction being greater than the second and third surfaces, a thickness defined by the inclined first surface and the second surface of each of the plurality of second prisms in the Z direction decreasing toward the center of the image display panel in the X direction.

2. The image display apparatus according to claim 1, wherein:

the plurality of second optical parts is a plurality of first prisms each having a first inclined surface facing the backlight device side, a thickness of each of the plurality of first prisms in the Z direction decreasing toward a center of the image display panel in the X direction, and the plurality of first optical parts is a plurality of second prisms each having a second inclined surface facing the image display panel side, a thickness of each of the plurality of second prisms in the Z direction decreasing toward the center of the image display panel in the X direction.

3. The image display apparatus according to claim 2, wherein a plurality of the first prisms are provided for each one of the plurality of second prisms.

4. The image display apparatus according to claim 1, wherein an image signal for right eye and an image signal for left eye to which a parallax is provided are alternately inputted into the image display panel in a time division manner, the backlight device includes:

a light guide plate having a pair of side surfaces and configured to guide light incident on the side surfaces, to an emission surface;

a first light source located so as to face one of the side surfaces and configured to emit illumination light for displaying an image for right eye;

a second light source located so as to face the other of the side surfaces and configured to emit illumination light for displaying an image for left eye; and a light control sheet configured to deflect the light emitted from the first light source and the second light source toward ahead of a center of the image display panel, and the first light source and the second light source alternately light up in synchronization with switching between the image signal for right eye and the image signal for left eye.

5. An image display apparatus comprising:

an image display panel;

a backlight device located on a back surface side of the image display panel;

a first optical element located between the image display panel and the backlight device and including a first deflection element having a plurality of first optical parts and a second deflection element, each of the plurality of first optical parts having a predetermined inclination and being configured to deflect light incident thereon, the second deflection element being configured to change a deflection direction of light incident on the first optical element by changing a refractive index of the second deflection element in accordance with a voltage applied thereto;

a second optical element located between the first optical element and the backlight device, the second optical element having a plurality of second optical parts, each of the plurality of second optical parts having a predetermined inclination and being configured to deflect light incident thereon;

a position detection section configured to detect a position of a user; and a control section configured to control the voltage applied to the second deflection element, on the basis of information about the position of the user detected by the position detection section, wherein:

in a case where a right-left direction when the user faces a display surface of the image display panel is defined as an X direction and a direction perpendicular to the display surface of the image display panel is defined as a Z direction, a thickness in the Z direction of each of the plurality of second optical parts continuously decreases toward a center of the second optical element along the X direction, a thickness in the Z direction of each of the plurality of first optical parts continuously decreases toward a center of the first optical element along the X direction, the plurality of second optical parts is a plurality of first prisms each having an inclined first surface facing the backlight device side, a second surface facing the image display panel side and a third surface, the inclined first surface, the second surface and the third surface forming a triangle in a cross section of an X-Z plane, an width of the inclined first surface along the X direction being greater than the second and third surfaces, a thickness defined by the inclined first surface and the second surface of each of the plurality of first prisms in the Z direction decreasing toward a center of the image display panel in the X direction, and the plurality of first optical parts is a plurality of second prisms each having a inclined first surface facing the image display panel side, a second surface facing the backlight device side and a third surface, the inclined first surface, the second surface and the third surface forming a triangle in a cross section of an X-Z plane, an width of the inclined first surface along the X direction being greater than the second and third surfaces, a thickness defined by the inclined first surface and the second surface of each of the plurality of second prisms in the Z direction decreasing toward the center of the image display panel in the X direction.

6. The image display apparatus according to claim 5, wherein:
the plurality of second optical parts is a plurality of first prisms each having a first inclined surface facing the backlight device side, a thickness of each of the plurality of first prisms in the Z direction decreasing toward a center of the image display panel in the X direction, and
the plurality of first optical parts is a plurality of second prisms each having a second inclined surface facing the image display panel side, a thickness of each of the plurality of second prisms in the Z direction decreasing toward the center of the image display panel in the X direction.

7. The image display apparatus according to claim 6, wherein
a plurality of the first prisms are provided for each one of the plurality of second prisms.

8. The image display apparatus according to claim 5, wherein an image signal for right eye and an image signal for left eye to which a parallax is provided are alternately inputted into the image display panel in a time division manner, the backlight device includes:
- a light guide plate having a pair of side surfaces and configured to guide light incident on the side surfaces, to an emission surface;
- a first light source located so as to face one of the side surfaces and configured to emit illumination light for displaying an image for right eye;
- a second light source located so as to face the other of the side surfaces and configured to emit illumination light for displaying an image for left eye; and
- a light control sheet configured to deflect the light emitted from the first light source and the second light source toward ahead of a center of the image display panel, and the first light source and the second light source alternately light up in synchronization with switching between the image signal for right eye and the image signal for left eye.

* * * * *